US005958297A

United States Patent [19]

Primdahl

[11] Patent Number: 5,958,297
[45] Date of Patent: Sep. 28, 1999

[54] PROCESS FOR THE PREPARATION OF HYDROGEN AND CARBON MONOXIDE RICH GAS

[75] Inventor: Ivar Ivarsen Primdahl, Copenhagen, Denmark

[73] Assignee: Haldor Topsoe A/S, Lyngby, Denmark

[21] Appl. No.: 08/696,523

[22] Filed: Aug. 14, 1996

Related U.S. Application Data

[63] Continuation of application No. 08/103,981, Aug. 9, 1993, abandoned.

[30] Foreign Application Priority Data

Aug. 13, 1992 [DK] Denmark ................................. 1013/92

[51] Int. Cl.[6] ........................................................ C07C 1/02
[52] U.S. Cl. ........................ 252/373; 423/418.2; 423/650; 48/127.9
[58] Field of Search ............................ 252/373; 48/127.9; 423/650, 651, 652, 245.3, 418.2

[56] References Cited

U.S. PATENT DOCUMENTS

| 2,943,062 | 6/1960 | Mader ................................... | 48/127.9 |
| 3,071,454 | 1/1963 | Kuzzell et al. ....................... | 48/127.9 |
| 3,920,579 | 11/1975 | Slater .................................... | 252/373 |
| 4,456,703 | 6/1984 | Aldridge ............................... | 502/524 |
| 4,618,451 | 10/1986 | Gent ...................................... | 252/373 |
| 4,690,690 | 9/1987 | Andrew et al. ....................... | 252/373 |
| 4,788,004 | 11/1988 | Pinto et al. ........................... | 252/373 |
| 4,863,707 | 9/1989 | McShea, III et al. ................. | 423/359 |
| 5,112,578 | 5/1992 | Muragame et al. ................... | 422/197 |

FOREIGN PATENT DOCUMENTS 944563  4/1974  Canada ................................... 252/373

OTHER PUBLICATIONS

Hawley, ed. The Condensed Chemical Dictionary, 10 ed, 1981, p. 729 (nitric acid defn.).

*Primary Examiner*—Michael Lewis
*Assistant Examiner*—Peter DiMauro
*Attorney, Agent, or Firm*—Ostrolenk, Faber, Gerb & Soffen, LLP

[57] ABSTRACT

Process for the preparation of hydrogen and/or carbon monoxide rich gas comprising partial oxidation of a hydrocarbon feedstock in a reactor with an upper and a lower portion and a refractory lining attached to an inner surface of the reactor, comprising the steps of introducing the feedstock and an oxygen containing atmosphere into the upper portion of the reactor;

partially oxidizing the feedstock with oxygen in the upper portion of the reactor; and contacting a part of the partially oxidized feedstock with a reforming catalyst arranged on the refractory lining in at least the upper portion of the reactor, so that to cool the lining by endothermic reforming reactions proceeding in the partially oxidized gas on the refractory lining.

3 Claims, No Drawings

PROCESS FOR THE PREPARATION OF HYDROGEN AND CARBON MONOXIDE RICH GAS

This is a continuation of application Ser. No. 08/103,981 filed on Aug. 9, 1993 now abandoned.

The present invention is directed to the preparation of hydrogen and carbon monoxide rich gas. In particular, the invention relates to a process and reactor for the preparation of such gas by non-catalytic partial oxidation or autothermal catalytic reforming of a hydrocarbon feedstock.

Hydrogen and carbon monoxide rich gases are mainly used as synthesis gas in the production of ammonia and methanol or other organic compounds.

The gases find further employment during steel production and as fuel or town gas.

Industrial preparation methods most usually comprise autothermal catalytic reforming and non-catalytic partial oxidation of hydrocarbons.

At non-catalytic partial oxidation processes a hydrocarbon feedstock is combusted together with air, oxygen, or oxygen enriched air in a burner mounted at the top of a reaction vessel. Oxygen is, thereby, supplied in amounts, which are less than the amount required for complete combustion, and hydrogen and carbon monoxide are produced in an effluent gas mainly by flame reactions:

$$C_nH_m + n/2 O_2 \leftrightarrows nCO + m/2 H_2 \quad (1)$$

$$C_nH_m + nO_2 \leftrightarrows nCO_2 + m/2 H_2O \quad (2)$$

Both reactions are strongly exothermic for all hydrocarbons.

Partial oxidation is typically employed in the gasification of heavy oils, where the temperature in the gas raises during the combustion to 1000–1500° C., which is high enough to give a sufficient low content of unconverted hydrocarbons in the combustion effluent gas.

Lighter feedstocks ranging from natural gas to naphtha fractions with a boiling point up to 200° C. are conventionally treated by autothermal catalytic reforming of the feedstock.

During this process, only a part of the hydrocarbon feedstock is oxidized with an oxygen containing atmosphere by the above flame reactions (1,2). Residual hydrocarbons in the gas stream from the combustion are then catalytically steam reformed by the endothermic reaction:

$$C_nH_m + nH_2O \leftrightarrows nCO + (m/2 + n)H_2 \quad (3)$$

Necessary heat for the endothermic steam reforming reaction is, thereby, provided by the exothermic flame reactions (1,2).

Somewhat lower combustion temperatures are used during autothermal catalytic reforming, which is operated at a typical temperature of about 900–1400° C. Steam is added to the feed in order to moderate the flame temperature and increase hydrocarbon conversion in the burner effluent gas.

Similar to the partial oxidation process, hydrocarbon feed mixed with steam is burnt with an oxygen containing atmosphere at the top of a reactor. Residual hydrocarbons in the combusted gas are then steam reformed in the presence of a catalyst arranged as fixed bed in a lower portion of the reactor. Heat for the endothermic steam reforming reactions is supplied by the hot effluent gas from the combustion zone in the upper reactor portion and above the catalyst bed. As the combustion gas contacts the catalyst, the temperature in the gas cools to 900–1100° C. by the steam reforming reactions in the catalyst bed.

In operating the above processes, suitable hydrocarbon feed, if necessary after preheating, is introduced into a burner mounted at the top of a reactor and burnt with oxygen containing atmosphere. In order to protect the reactor shell against the high temperatures arising during the exothermic oxidation reactions, industrial reactors are provided with a temperature resistant and insulating refractory lining on the inner wall of the reactor shell.

The lining materials must be able to withstand high temperature exposure and be suited to resistant erosion by hot gases. Presently, refractory materials most commonly used in industrial reactors of the above types contain more than 90% alumina. Although these materials are high-strength castables or bricks with good heat and wear-resistant properties, deterioration by contact with hot combustion gases containing carbon oxides, steam and hydrogen occurs most severely in the upper reactor portion surrounding the combustion zone. Due to the reducing nature of the gases, alumina in the refractory material is reduced to suboxides of aluminum, which are volatile in the high temperature environment in the reactor upper portion.

Surface evaporation of aluminium suboxides causes degradation of the lining and precipitation of aluminum oxide on the catalyst in the cooler portion of the reactor or on cooler surfaces in downstream equipment of the reaction system. As a result, gas passage through the reaction system is clogged by solids and the system must eventually be shut down.

It has now been found that the above problems during partial oxidation and autothermal catalytic reforming processes in refractory lined reactors are substantially avoided when cooling the surface of the reactor lining below the evaporation temperature of disintegration products from the refractory material by carrying out endothermic steam reforming reactions on the surface of the lining. Those reactions proceed in the combustion effluent gas when a suitable catalyst is arranged on the surface at least in the portion of the reactor, which surrounds the hot combustion zone.

Pursuant to this finding, this invention provides an improved process for the preparation of hydrogen and/or carbon monoxide rich gas comprising partial oxidation of a hydrocarbon feedstock in a reactor with an upper and a lower portion and a refractory lining attached to an inner surface of the reactor, comprising the steps of introducing the feedstock and an oxygen containing atmosphere into the upper portion of the reactor;

partially oxidizing the feedstock with oxygen in the upper portion of the reactor; and contacting a part of the partially oxidized feedstock with a reforming catalyst arranged on the refractory lining in at least the upper portion of the reactor, so that to cool the lining by endothermic reforming reactions proceeding in the partially oxidized gas on the refractory lining.

Furthermore, the invention provides a reactor, which is useful in carrying out the above inventive process.

The reactor according to the invention comprises within a pressure shell a refractory lining on an inner wall of the shell, an upper portion adapted to receive a hydrocarbon feedstock and an oxygen containing atmosphere, and to partially oxidize the feedstock with oxygen, which reactor further comprises a reforming catalyst arranged on the refractory lining in at least the upper portion of the reactor.

In operating a specific embodiment of the inventive process and reactor, a hydrocarbon feedstock preheated to about 400–700° C. is introduced into a burner mounted at the top of a refractory lined reactor. In the burner, the feedstock is mixed with steam and oxygen containing atmosphere in an amount providing a process gas with an oxygen/carbon mole ratio of preferably between 0.5 and 0.7 and a steam/carbon mole ratio of preferably between 0.5 and 1.5. Typical hydrocarbon feedstocks suited for the process will range from methane to naphtha fractions with a boiling point up to 200° C., including natural gas, LPG and primary reformed gas, when operating the process under autothermal catalytic reforming conditions. For higher hydrocarbon feedstocks like heavy oil fractions, the process will be carried out at non-catalytic partial conditions. At both process conditions, the process gas is discharged from the burner into a combustion zone in the upper reactor portion, where part of the hydrocarbons in the gas are reacted with oxygen to carbon oxides and hydrogen by flame reactions (1) and (2) as mentioned hereinbefore.

Depending on the desired composition of the final product gas, oxygen may be supplied from air as in the preparation of ammonia synthesis gas, or from oxygen or oxygen enriched air for the production of oxosynthesis gas and reducing gas, where nitrogen is unwanted in the product gas. During hydrocarbon oxidation the temperature in the combustion zone raises to 900–1500° C.

Cooling of the refractory lining around the combustion zone is performed by passing a part of the combusted effluent gas containing unconverted hydrocarbons across the refractory surface in contact with a reforming catalyst arranged thereon. By the endothermic steam reforming reaction (3) proceeding in the gas on the refractory surface, the temperature in the effluent gas passing across the catalyzed refractory lining is lowered by 100° C. to 300° C., which cools the lining sufficiently below the evaporation point of disintegration products. The actual temperature decrease on the refractory surface depends, thereby, on the amount of hydrocarbons and steam in the gas from the combustion zone and the activity and amount of reforming catalyst on the refractory material.

Catalysts suited for this purpose comprise the well-known reforming catalysts of Group VIII in the Periodic Table, including nickel and/or cobalt, which for sufficient cooling are loaded in an amount of between 0.01 g/m$^2$ and 0.15 g/cm$^2$ on the lining surface by conventional impregnation or wash coating techniques. When wash coating techniques are used for the loading of the catalyst, it is preferred to apply a binding layer of magnesium aluminium spinel on the surface prior to coating with the catalytic material or precursors thereof.

When the process takes place at autothermal catalytic reforming conditions, the effluent gas from the combustion zone is further passed through a fixed bed of conventional nickel and/or cobalt reforming catalyst arranged in the lower portion of the reactor. By passage through the catalyst bed, residual hydrocarbons in the gas are further steam reformed to hydrogen and carbon monoxide.

At non-catalytic partial oxidation conditions, the effluent gas from the combustion zone being rich in carbon monoxide and hydrogen is directly withdrawn from the lower portion of the reactor.

By decreasing the temperature in the refractory lining, as described above substantially, no evaporation of disintegration products from the refractory lining into the effluent gas occurs in the upper hot portion of the reactors. Precipitation of such products is, thereby, appreciately avoided, which otherwise would cause troubles in the lower cooler portion of the reactor or downstream equipment.

I claim:

1. Process for the preparation of hydrogen and carbon monoxide containing gas comprising partial oxidation of a hydrocarbon feedstock in a reactor with an upper and a lower portion and an alumina containing refractory lining attached to an inner surface of the reactor, comprising the steps of introducing the feedstock and an oxygen containing atmosphere into the upper portion of the reactor;

partially oxidizing the feedstock with oxygen by a non-catalytic flame reaction in the upper portion of the reactor whereby a partially oxidized feedstock having a temperature in the range 1000°–1500° C. is produced; and contacting a part of the partially oxidized feedstock with a reforming catalyst washcoated on the refractory lining in at least the upper portion of the reactor, so as to cool the lining by endothermic reforming reactions proceeding in the partially oxidized gas on the refractory lining.

2. The process of claim 1, wherein the partially oxidized feedstock from the upper portion of the reactor is further contacted with a steam reforming catalyst washcoated in the lower portion of the reactor.

3. The process of claim 1, wherein the reforming catalyst is washcoated in an amount of between 0.01 g/m$^2$ and 0.15 g/m$^2$ on the refractory lining.

* * * * *